US 8,214,002 B2

(12) United States Patent
Noma et al.

(10) Patent No.: US 8,214,002 B2
(45) Date of Patent: Jul. 3, 2012

(54) PORTABLE TERMINAL

(75) Inventors: Satoru Noma, Hino (JP); Keiyo Hatano, Tokyo (JP)

(73) Assignee: Fujitsu Toshiba Mobile Communications Limited, Kawasaki (JP)

(*) Notice: Subject to any disclaimer, the term of this patent is extended or adjusted under 35 U.S.C. 154(b) by 338 days.

(21) Appl. No.: 12/699,261

(22) Filed: Feb. 3, 2010

(65) Prior Publication Data
US 2010/0309627 A1  Dec. 9, 2010

(30) Foreign Application Priority Data
Jun. 8, 2009  (JP) .............................. P2009-137579

(51) Int. Cl.
*H04M 1/00*  (2006.01)
*H01F 7/02*  (2006.01)
(52) U.S. Cl. ....................... 455/575.4; 335/285; 335/306
(58) Field of Classification Search .................. 335/285, 335/306; 455/90.3, 575.1, 575.4
See application file for complete search history.

(56) References Cited

U.S. PATENT DOCUMENTS
7,889,037 B2 *  2/2011  Cho .............................. 335/306

FOREIGN PATENT DOCUMENTS
JP  2007-288436 A  11/2007
JP  2008-113067 A  5/2008

* cited by examiner

*Primary Examiner* — Ramon Barrera
(74) *Attorney, Agent, or Firm* — Maschoff Gilmore & Israelsen

(57) ABSTRACT

According to an aspect of the present invention, there is provided a portable terminal including: a first housing; a second housing slidable in a sliding direction with respect to the first housing; a first magnet disposed in the first housing; a second magnet disposed in the second housing to face the first magnet in a closed state; and a third magnet disposed in the second housing to face the first magnet in an opened state, wherein an S pole of the first magnet is positioned on a side of the first housing facing the second housing, and wherein an N pole of the second magnet, an S pole of the second magnet, an S pole of the third magnet and an N pole of the third magnet are aligned as a sequence along the sliding direction.

11 Claims, 4 Drawing Sheets

FIG. 4
JP-2007-288436-A (RELATED ART)
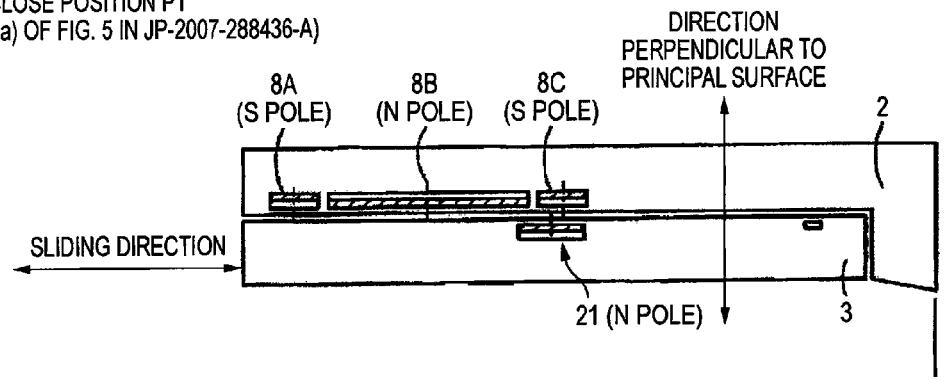
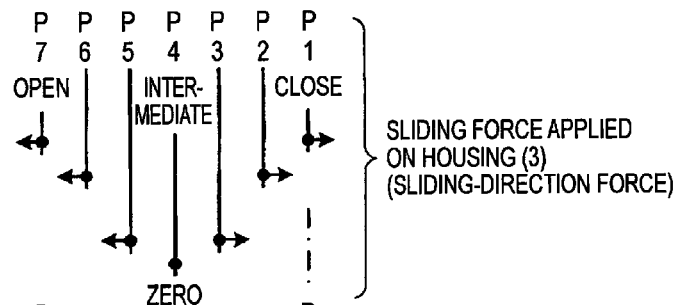
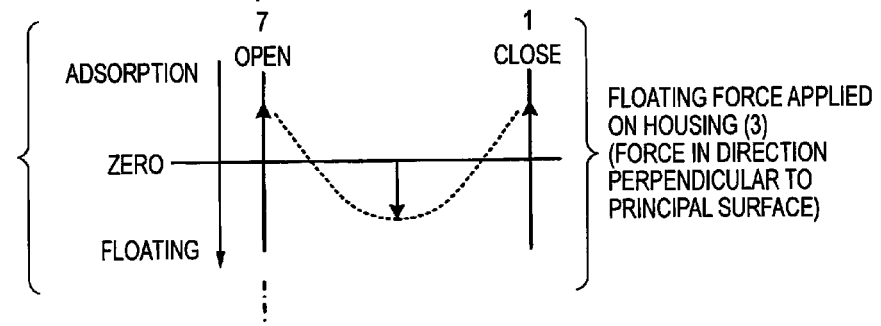
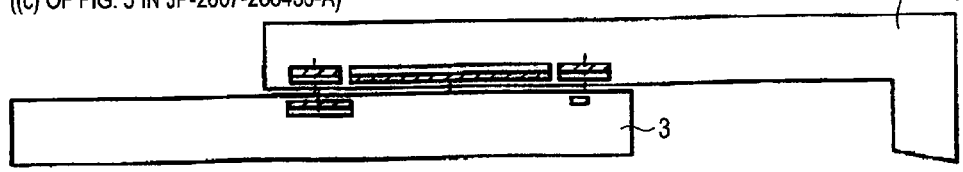

PORTABLE TERMINAL

CROSS-REFERENCE TO RELATED APPLICATIONS

This application claims priority from Japanese Patent Application No. 2009-137579 filed on Jun. 8, 2009, the entire contents of which are incorporated herein by reference.

BACKGROUND OF THE INVENTION

1. Field of the Invention

An aspect of the present invention relates to a housing siding type portable terminal in which magnets for generating both assisting force and holding force in accordance with a user's operation of sliding a housing are provided.

2. Description of the Related Art

In a housing sliding type portable terminal, a spring and magnets are used for assistance and holding in order to make a user's sliding operation smooth.

There is a sliding mechanism using such magnets (e.g. see JP-2008-113067-A). Magnetic force in the sliding mechanism of JP-2008-113067-A will be described below.

FIG. 3 illustrates a magnetic force corresponding to FIGS. 12C and 12D and paragraph [0046] in JP-2008-113067-A. In FIG. 3, (A) shows a close position, and (C) shows an open position. A housing 204 is provided with one magnet 402. A housing 202 is provided with two magnets 404 and 406.

The center position of the magnet 402 in the one-magnet housing 204 is slid between a position P1 (close position) and a position P7 (open position) relative to the two-magnet housing 202.

In (D) of FIG. 3, respective arrows express a magnetic force in a sliding direction applied on the one-magnet housing 204 in respective positions between P1 and P7. In (E) of FIG. 3, arrows and a dotted graphic curve express a repulsive force perpendicular to a principal surface, that is, a floating force applied on the one-magnet housing 204 in respective positions between P1 and P7.

In (D) of FIG. 3, sliding force in P1 (close position) is substantially zero because the respective center positions of the magnets 402 and 404 coincide with each other. In P2 or P3, rightward force to restore the center position of the magnet 402 to P1 (close position) is generated. In P4 (intermediate position), the magnet 402 is located at a middle point between the magnets 404 and 406, and sliding force is zero. The magnet 402 in P4 is however so unstable as to be apt to move either left or right. In P5 or P6, leftward force to move the center position of the magnet 402 to P7 (open position) is generated. In P7 (open position), sliding force is substantially zero because the respective center positions of the magnets 402 and 406 coincide with each other.

When a user pushes the housing 204 against such generated sliding force so that the center position of the magnet 402 moves from P1 (close position) to the left against rightward sliding force in P2 and P3, the center position of the magnet 402 is slid to P7 (open position) via P5 and P6 by leftward sliding force and held in P7 after the center of the magnet 402 goes beyond P4 (intermediate position).

Accordingly, the user needs to push the housing 204 continuously up to a position corresponding to a half of the sliding distance. After the center of the magnet 402 goes beyond the half position, the housing 204 is abruptly slid by sliding force.

In a direction of floating force in (E) of FIG. 3, adsorbing force by which the magnets attract each other in a direction perpendicular to the principal surface is generated in P1 (close position) and P7 (open position). Floating force due to repulsion of the magnets in the direction perpendicular to the principal surface is generated in a range of from P2 to P6.

There is also a slide type portable terminal using magnets (e.g. see JP-2007-288436-A). Magnetic force concerned with a sliding mechanism disposed in JP-2007-288436-A will be described below.

FIG. 4 illustrates a magnetic force corresponding to FIG. 5 and paragraphs [0048] to [0060] in JP-2007-288436-A. In FIG. 4, (A) shows a closed state, and (C) shows an opened state. A housing 3 is provided with one magnet 21. A housing 2 is provided with three magnets 8A, 8B and 8C. Magnetic poles of the respective magnets on facing sides of the housings are put in parentheses.

The center position of the magnet 21 in the one-magnet housing 3 is slid between a position P1 (close position) and a position P7 (open position) relative to the three-magnet housing 2. In (D) of FIG. 4, arrows express a magnetic force in a sliding-direction applied on the one-magnet housing 3 in respective positions between P1 and P7. In (E) of FIG. 4, directions of arrows and a dotted graphic curve express a repulsive force in a direction perpendicular to the principal surface, that is, a floating force applied on the one-magnet housing 3 in respective positions between P1 and P7.

(D) of FIG. 4 is substantially the same as (D) of FIG. 3 except that sliding force is generated in P1 (close position) and P7 (open position) in (D) of FIG. 4. Sliding force in P3 or P5 in (D) of FIG. 4 is smaller than that in (D) of FIG. 3 because the magnet 21 is slid in the long magnet 8B.

When the user pushes the housing 3 against such generated sliding force so that the center position of the magnet 21 moves from P1 (close position) to the left against rightward sliding force in P2 and P3, the center position of the magnet 21 is slid to P7 (open position) via P5 and P6 by leftward sliding force and held in P7 after the center of the magnet 21 goes beyond P4.

Accordingly, the user needs to push the housing 3 continuously up to a position corresponding to a half of the sliding distance. After the center of the magnet 21 goes beyond the half position, the housing 3 is abruptly slid by sliding force.

Floating force in (E) of FIG. 4 is as follows. Adsorbing force by which the magnets attract each other in a direction perpendicular to the principal surface is generated in P1 (close position) and P7 (open position). Floating force due to repulsion of the magnets in the direction perpendicular to the principal surface is generated in a range of from P2 to P6.

According to JP-2008-113067-A and JP-2007-288436-A, user-friendliness in sliding operation is poor because the user needs to push the housing continuously up to a position corresponding to a half of the sliding distance when the user wants to slide the housing. Moreover, because the housing is abruptly slid by sliding force after the center of the magnet goes beyond the half position, there is a problem that shock at stopping of the housing is so large that the shock has to be absorbed sufficiently. In addition, because adsorbing force is generated in a direction perpendicular to the principal surface, the user feels unsmoothness in performing sliding operation.

SUMMARY OF THE INVENTION

According to an aspect of the present invention, there is provided a portable terminal including: a first housing; a second housing slidable in a sliding direction with respect to the first housing between an opened state and a closed state; a first magnet disposed in the first housing; a second magnet disposed in the second housing to face the first magnet in the closed state; and a third magnet disposed in the second housing to face the first magnet in the opened state, wherein an S pole of the first magnet is positioned on a side of the first housing facing the second housing, while an N pole thereof is positioned on an opposite side of the first housing, and wherein an N pole of the second magnet, an S pole of the second magnet, an S pole of the third magnet and an N pole of the third magnet are aligned as a sequence along the sliding direction.

BRIEF DESCRIPTION OF THE DRAWINGS

FIG. 4 illustrates an arrangement of magnets in JP-2007-288436-A, as viewed from side.

DETAILED DESCRIPTION OF THE INVENTION

Figure 1:
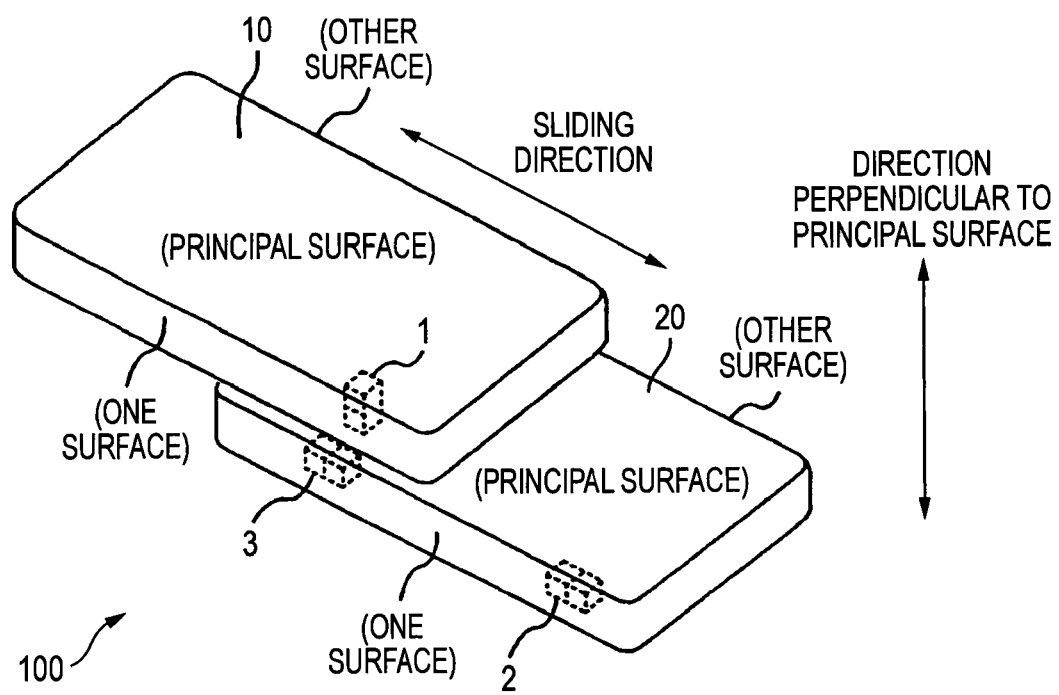
FIG. 1 illustrates an appearance of a portable terminal 100 according to an embodiment.

FIG. 1 illustrates an appearance of a portable terminal 100 according to an embodiment. The portable terminal 100 includes a first housing 10 and a second housing 20 which are slid in a sliding direction relative to each other. The first housing 10 has a first magnet 1 provided on the inner side of the first housing 10 at one side. The second housing 20 has a second magnet 2 and a third magnet 3 which are provided on the inner side of the second housing 20 at the one side which is the same side on which the first magnet 1 is provided.

These three magnets are arranged along one and the same line in the sliding direction so that magnetic force performs both assistance and holding in accordance with a user's sliding operation.

Although the case where a set of the three magnets are provided on one side is exemplified, the set of the three magnets may be provided along the sliding direction at a center portion between one side and the other side. Alternatively, another set of magnets may be further provided along the sliding direction at the other side.

Figure 2:
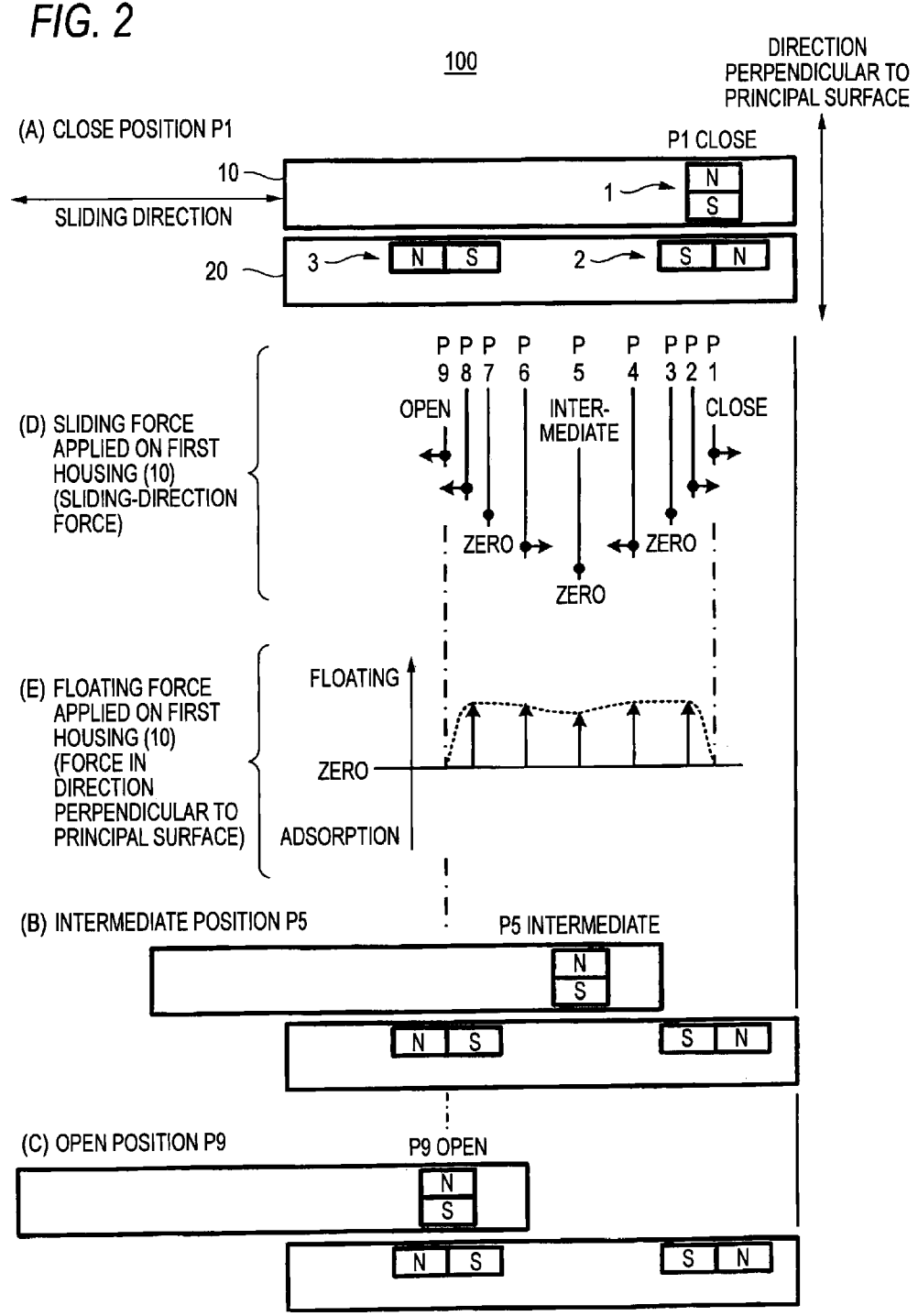
FIG. 2 illustrates an example arrangement of magnets in the portable terminal 100 according to the embodiment, as viewed from side.
Figure 3:
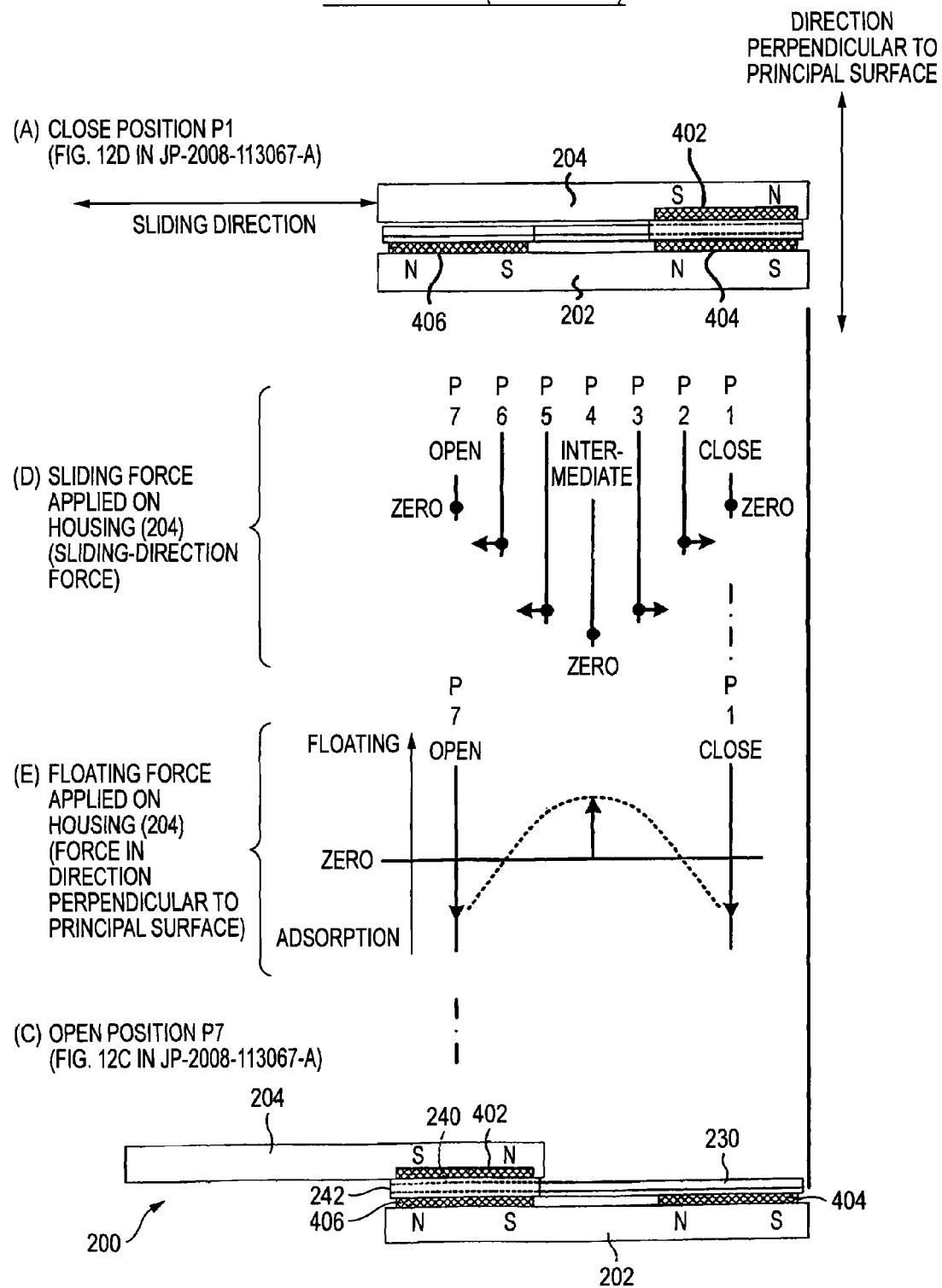
FIG. 3 illustrates an arrangement of magnets in JP-2008-113067-A, as viewed from side.

FIG. 2 illustrates an example arrangement of the magnets in the portable terminal 100 according to the embodiment, as viewed from side. In FIG. 2, (A) shows a close position where a stopper (not shown) stops the first housing 10 from sliding to the right any more, (B) shows an intermediate position, and (C) shows an open position where a stopper (not shown) stops the first housing 10 from sliding to the left any more. The first housing 10 is provided with the first magnet 1. The second housing 20 is provided with the second and third magnets 2 and 3.

In the first housing 10, the first magnet 1 has an S pole disposed on a side facing on the second housing 20, and an N pole disposed on an opposite side in a direction perpendicular to a principal surface. In the second housing 20, the second and third magnets 2 and 3 are provided so that an N pole of the second magnet 2, an S pole of the second magnet 2, an S pole of the third magnet 3 and an N pole of the third magnet 3 are arranged as a sequence of magnetic poles along the same line in the sliding direction. That is, S poles are disposed on the inner side and N poles are disposed on the outer side.

The center position of the first magnet 1 in the one-magnet first housing 10 is slid between a position P1 (close position) and a position P9 (open position) relative to the two-magnet second housing 20. In (D) of FIG. 2, directions of arrows correspond to s magnetic force in the sliding direction applied on the one-magnet first housing 10 in respective positions between P1 and P9. In (E) of FIG. 2, directions of arrows and a dotted graphic curve correspond to a repulsive force in a direction perpendicular to the principal surface, that is, a floating force applied on the one-magnet first housing 10 in respective positions between P1 and P9.

In (D) of FIG. 2, in P1 (close position), the first magnet 1 is located in a center portion between the S and N poles of the second magnet 2 so that rightward sliding force to close the first housing 10 is generated based on repulsion of the S pole of the first magnet 1 and the S pole of the second magnet 2 and attraction of the S pole of the first magnet 1 and the N pole of the second magnet 2. In P2, rightward force to restore the first housing 10 to P1 (close position) is generated in the same manner as in P1.

In P3, the center point of the S pole of the first magnet 1 is slightly on the left of the center point of the S pole of the second magnet 2. And, slightly leftward sliding force is applied on the first housing 10, while attraction of the S pole of the first magnet 1 and the N pole of the second magnet 2 remains a little. Thus, both attraction and repulsion of the magnets are cancelled by each other so that the sliding force becomes zero.

In the further left position P4, repulsion of the S pole of the first magnet 1 and the S pole of the second magnet 2 becomes so strong that leftward sliding force is generated.

In P5 (intermediate position), sliding force is zero because the repulsive force of the first magnet 1 and the second magnet 2 and the repulsive force of the first magnet 1 and the third magnet 3 compete with each other.

Sliding forces symmetrical to those in P4, P3, P2 and P1 (close position) are generated in P6, P7, P8 and P9 (open position), respectively.

When the user pushes the first housing 10 against such generated sliding force so that the center position of the first magnet 1 moves from P1 (close position) to the left against rightward sliding force in P1 and P2, repulsive force against the user's operation is eliminated in P3 earlier than the intermediate position P5 and leftward assisting force is generated in P4 so that movement of the center position of the first magnet 1 is assisted before P5 (intermediate position). When the user pushes the first housing 10 to the left again against rightward sliding force in P6, the center position of the first magnet 1 is held in P9 (open position) by leftward sliding force in P8 and P9 (open position) after it passes through P7.

As a result, sliding of the first housing 10 is assisted without necessity of user's continuous pushing to P5 (intermediate position). Moreover, when the center position of the first magnet 1 is held in P9 (open position), shock can be relaxed due to sliding force in P8 and P9.

Floating force in (E) of FIG. 2 is as follows. In P1 (close position), repulsion of the S pole of the first magnet 1 and the S pole of the second magnet 2 and attraction of the S pole of the first magnet 1 and the N pole of the second magnet 2 complete with each other in a direction perpendicular to the principal surface so that floating force is substantially zero and there is no attractive force generated as a whole. Floating force in P9 (open position) is substantially zero likewise.

In each position between P1 (close position) and P9 (open position), floating force is generated based on repulsion of the S pole of the first magnet 1 and the S pole of the second magnet 2 and repulsion of the S pole of the first magnet 1 and the S pole of the third magnet 3.

When the user wants to slide the first housing 10, the user may often slide the first housing 10 while not pressing an end surface of the first housing 10 but pressing the principal surface side of the first housing 10 with the user's thumb. For this reason, there is a possibility that friction between the first housing 10 and the second housing 20 will increase because of downward force perpendicular to the principal surface. The friction is however reduced by upward floating force generated in all sliding regions so that the first housing 10 can be slid smoothly.

As described above, according to the embodiment, smooth motion can be obtained when the user slides the housing because assisting force based on magnets is generated in a position before a position corresponding to a half of the sliding distance. Moreover, shock due to magnets in the final sliding position can be relaxed. In addition, smooth motion can be obtained because friction in a direction perpendicular to the principal surface can be relaxed.

The order of arrangement of respective magnetic poles of the magnets may be reversed. That is, the respective magnet poles of the magnets may be arranged so that the S and N poles of the first magnet 1 are put in reverse order, the S and N poles of the second magnet 2 are put in reverse order and the S and N poles of the third magnet 3 are put in reverse order.

A sliding spring which has been heretofore used as a sliding assistant may be used in combination with the magnets. Consequently, the size of the spring and the number of turns of the spring can be reduced so that the size and thickness of the portable terminal can be reduced.

The embodiment can be applied also to a sliding type structure in a cellular phone, a PHS, a game machine, etc.

According to an aspect of the invention, there is provided a sliding mechanism using magnets in which user-friendliness in sliding operation can be improved and in which shock can be relaxed.

What is claimed is:

1. A portable terminal comprising:
   a first housing;
   a second housing slidable in a sliding direction with respect to the first housing between an opened state and a closed state;
   a first magnet disposed in the first housing;
   a second magnet disposed in the second housing to face the first magnet in the closed state; and
   a third magnet disposed in the second housing to face the first magnet in the opened state,
   wherein an S pole of the first magnet is positioned on a side of the first housing facing the second housing, while an N pole thereof is positioned on an opposite side of the first housing, and
   wherein an N pole of the second magnet, an S pole of the second magnet, an S pole of the third magnet and an N pole of the third magnet are aligned as a sequence along the sliding direction.

2. A portable terminal comprising:
   a first housing;
   a second housing slidable in a sliding direction with respect to the first housing between an opened state and a closed state;
   a first magnet disposed in the first housing;
   a second magnet disposed in the second housing to face the first magnet in the closed state; and
   a third magnet disposed in the second housing to face the first magnet in the opened state,
   wherein an N pole of the first magnet is positioned on a side of the first housing facing the second housing, while an S pole thereof is positioned on an opposite side of the first housing, and
   wherein an S pole of the second magnet, an N pole of the second magnet, an N pole of the third magnet and an S pole of the third magnet are aligned as a sequence along the sliding direction.

3. A portable terminal comprising:
   a first housing;
   a second housing that is slidable in a sliding direction with respect to the first housing between an opened state and a closed state;
   a first magnet that is disposed in the first housing and that is aligned in a direction perpendicular to the sliding direction, a first pole thereof facing to the second housing, a second pole thereof being away from the second housing;
   a second magnet that is disposed in the second housing to face the first magnet in the closed state and that is aligned in the sliding direction, a first pole thereof being positioned inward, a second pole thereof being positioned outward; and
   a third magnet that is disposed in the second housing to face the first magnet in the opened state and that is aligned in the sliding direction, a first pole thereof being positioned inward, a second pole thereof being positioned outward.

4. The portable terminal of claim 3,
   wherein the first poles of the first to third magnets is one of an S and N poles, and
   wherein the second poles of the first to third magnets is the other of the S and N poles.

5. The portable terminal of claim 3,
   wherein, in an intermediate state between the closed state and the opened state, the first magnet does not overlap with neither the second magnet nor the third magnet, as viewed form the direction perpendicular to the sliding direction.

6. The portable terminal of claim 3,
   wherein the first to third magnets are arranged along a line parallel to the sliding direction.

7. The portable terminal of claim 6,
   wherein the first to third magnets are positioned at one sides of the first and second housings in the direction perpendicular to the sliding direction.

8. The portable terminal of claim 6,
   wherein the first to third magnets are positioned at center portions of the first and second housings in the direction perpendicular to the sliding direction.

9. The portable terminal of claim 3, further comprising:
   a fourth magnet disposed in the first housing;
   a fifth magnet disposed in the second housing to face the fourth magnet in the closed state; and
   a sixth magnet disposed in the second housing to face the fourth magnet in the opened state.

10. The portable terminal of claim 9,
    wherein the first to third magnets are arranged along one line parallel to the sliding direction, and
    wherein the fourth to sixth magnets are arranged along another line parallel to the sliding direction.

11. The portable terminal of claim 10,
    wherein the first to third magnets are positioned at one sides of the first and second housings in the direction perpendicular to the sliding direction, and
    wherein the fourth to sixth magnets are positioned at the other sides of the first and second housings in the direction perpendicular to the sliding direction.

* * * * *